United States Patent
Scheufler et al.

(12)

(10) Patent No.: US 12,120,975 B2
(45) Date of Patent: Oct. 22, 2024

(54) METHOD FOR DETERMINING SETTING RECOMMENDATIONS

(71) Applicant: AMAZONEN-WERKE H. DREYER GMBH & CO. KG, Hasbergen (DE)

(72) Inventors: Bernd Scheufler, Hasbergen (DE); Markus Ströbel-Fröschle, Georgsmarienhütte (DE); Florian Rahe, Lotte (DE)

(73) Assignee: Amazonen-Werke H. Dreyer SE & Co. KG (DE)

( * ) Notice: Subject to any disclaimer, the term of this patent is extended or adjusted under 35 U.S.C. 154(b) by 718 days.

(21) Appl. No.: 17/297,208

(22) PCT Filed: Nov. 25, 2019

(86) PCT No.: PCT/EP2019/082367
§ 371 (c)(1),
(2) Date: May 26, 2021

(87) PCT Pub. No.: WO2020/109206
PCT Pub. Date: Jun. 4, 2020

(65) Prior Publication Data
US 2022/0022367 A1 Jan. 27, 2022

(30) Foreign Application Priority Data
Nov. 26, 2018 (DE) .................. 10 2018 129 716.5
Nov. 22, 2019 (EP) ..................... 19401048

(51) Int. Cl.
*A01C 17/00* (2006.01)
*A01C 21/00* (2006.01)

(52) U.S. Cl.
CPC .......... *A01C 17/008* (2013.01); *A01C 21/005* (2013.01); *A01C 21/007* (2013.01)

(58) Field of Classification Search
None
See application file for complete search history.

(56) References Cited

U.S. PATENT DOCUMENTS

| | | | |
|---|---|---|---|
| 6,466,321 B1 * | 10/2002 | Satake ................. | A01G 7/00 356/402 |
| 2001/0016053 A1 * | 8/2001 | Dickson .............. | G01J 3/2823 382/110 |

(Continued)

FOREIGN PATENT DOCUMENTS

| | | |
|---|---|---|
| DE | 36 04 449 A1 | 8/1987 |
| EP | 3 165 068 A1 | 5/2017 |

(Continued)

OTHER PUBLICATIONS

International Preliminary Report on Patentability issued May 25, 2021 in corresponding PCT Application No. PCT/EP2019/082367.

(Continued)

*Primary Examiner* — Patrick Assouad
*Assistant Examiner* — Mark A Shabman
(74) *Attorney, Agent, or Firm* — Mintz Levin Cohn Ferris Glovsky and Popeo, P.C.

(57) ABSTRACT

A method for determining setting recommendations for an agricultural spreader includes the steps of: determining an uneven spreading-material distribution in a usable agricultural area or an uneven nutritional status of plants in the usable agricultural area, determining an ideal balancing distribution of spreading material that balances out unevenness of the determined spreading-material distribution in the usable agricultural area or unevenness of the determined nutritional status of the plants in the usable agricultural area, and determining setting recommendations for the agricultural spreader for implementing a balancing distribution of (Continued)

the spreading material, wherein the balancing distribution approximates the ideal balancing distribution.

17 Claims, 5 Drawing Sheets

(56) References Cited

U.S. PATENT DOCUMENTS

| | | | | |
|---|---|---|---|---|
| 2003/0019151 A1* | 1/2003 | Raun | ................... | A01C 21/007 |
| | | | | 47/58.1 SC |
| 2020/0275603 A1* | 9/2020 | Rahe | ................... | A01C 17/008 |

FOREIGN PATENT DOCUMENTS

| | | |
|---|---|---|
| EP | 3 409 094 A1 | 12/2018 |
| WO | 99/19824 A1 | 4/1999 |

OTHER PUBLICATIONS

International Search Report issued Feb. 27, 2020 in corresponding PCT Application No. PCT/EP2019/082367.

* cited by examiner

METHOD FOR DETERMINING SETTING RECOMMENDATIONS

The invention relates to a method for determining setting recommendations for an agricultural spreading machine and a method for spreading a spreading material.

When spreading a spreading material, such as fertilizer, on a usable agricultural area, an attempt is always made, with a few exceptions, to implement a spreading material distribution on the usable agricultural area that is as uniform as possible.

However, due to various circumstances, the spreading material may be applied in a non-uniform manner on the usable agricultural area. Due to the non-uniform distribution of spreading material on the usable agricultural area, the result is then a non-uniform nutritional status of the plants growing on the usable agricultural area, which may significantly affect the yield.

For example, unsuitable or incorrect machine settings on the agricultural spreading machine may lead to a non-uniform spreading material distribution. Furthermore, altered flight characteristics of the spreading material may cause a non-uniform spreading material distribution. Furthermore, it is conceivable that environmental influences, such as strong gusts of wind, lead to a non-uniform spreading material distribution on the usable agricultural area.

The non-uniform nutritional status of the plants on the usable agricultural area is also referred to in practice as technical stripe disease, which should always be prevented to avoid yield loss. In the prior art, no practical solutions are known to date, with which an already existing technical stripe disease in plants on an usable agricultural area can be effectively treated.

The object underlying the present invention is thus to provide a practicable solution for compensating for a non-uniform nutritional status of plants on an usable agricultural area.

The object is solved by a method for determining setting recommendations of the type mentioned at the beginning, wherein in the context of the method according to the invention an ideal compensation distribution of the spreading material is determined, which compensates for the non-uniformities of the determined spreading material distribution on the usable agricultural area or for the non-uniformities of the determined nutritional status of the plants on the usable agricultural area. Subsequently, setting recommendations for an agricultural spreading machine for implementing a balancing distribution of the spreading material that are realizable with the agricultural spreading machine are determined, wherein the realizable balancing distribution is approximated to the ideal balancing distribution.

The present invention makes use of the knowledge that non-uniform spreading patterns on an usable agricultural area may be compensated with a counter spreading pattern, thus eliminating or at least significantly reducing the non-uniformity of a spreading material distribution or the non-uniformity of a nutritional status of plants on the usable agricultural area. The non-uniform spreading material distribution and the compensating distribution are cross distributions or lateral distributions of the spreading material. The determined spreading material distribution and the balancing distribution preferably result in a substantially uniform spreading material distribution in total. The setting recommendations for the agricultural spreading machine may relate to recommendations for the feed point of the spreading material to be set on at least one spreading disc of the agricultural spreading machine and/or the rotational speed of the at least one spreading disc of the agricultural spreading machine to be set. By means of a corresponding feed point of the spreading material as well as a corresponding spreading disc speed, a lateral distribution of the spreading material is preferably implemented, which leads to the compensation of the non-uniformities of the determined distribution of the spreading material on the usable agricultural area or to the compensation of the non-uniformities of the determined nutritional status of the plants on the usable agricultural area.

For example, the agricultural spreader is configured as a two-disc fertilizer spreader and has two rotatably drivable spreading discs arranged side by side.

In some applications, such as orchards or strip-cropped intercropping, a non-uniform spreading material distribution or nutritional condition or status of the plants on the usable agricultural area may even be intended. The method according to the invention for determining setting recommendations may also be used in these fields of application, wherein the determined balancing distribution of the spreading material in these cases leads to the achievement of a desired non-uniformity of the spreading material distribution on the usable agricultural area or to the achievement of a non-uniform nutritional status of the plants on the usable agricultural area. Accordingly, the determined spreading material distribution and the balancing distribution may, in total, result in a non-uniform spreading material distribution, if desired.

In a preferred embodiment of the method according to the invention, the determination of the non-uniform spreading material distribution on the useable agricultural area or of the non-uniform nutritional status of the plants on the usable agricultural area, the determination of the ideal balancing distribution of the spreading material and/or the determination of the setting recommendations for the agricultural spreading machine for implementing the balancing distribution of the spreading material, which may be realized with the agricultural spreading machine, are carried out by means of a computing device. The computing device is preferably part of a central computer system, the agricultural spreading machine or a mobile terminal. The central computer system may be, for example, a server, which may be operated by the manufacturer of the agricultural spreading machine. The mobile terminal may be a smartphone or a tablet. The computing device may further be part of a terminal, a job computer, or another computer system of the agricultural spreading machine.

It is further advantageous to have a method according to the invention, in which the determination of the setting recommendations for the agricultural spreading machine for implementing the balancing distribution of the spreading material that may be realized with the agricultural spreading machine is carried out using spreading data that is stored on a database. For example, the database may be a component of the central computer system. For example, distribution information on the lateral distributions that may be realized with the agricultural spreading machine is stored on the database as a function of the machine settings and/or the machine configuration. Using the spreading data stored on the database, it is thus possible to determine a feasible balancing distribution, whose deviations from the ideal balancing distribution are minimal.

In a further preferred embodiment of the method according to the invention, determining the setting recommendations for the agricultural spreader for implementing the spreading material balancing distribution that may be realized with the agricultural spreader comprises calculating a plurality of balancing distributions that may be realized with the agricultural spreader and/or comparing the calculated balancing distributions that may be realized with the agricultural spreader with the determined ideal balancing distribution of the spreading material. On the basis of the calculated balancing distributions that may be realized with the spreading machine, the realizable balancing distribution that has the smallest deviations from the determined ideal balancing distribution of the spreading material may then be selected. Each of the balancing distributions that may be realized with the agricultural spreader is assigned setting parameters that are to be set on the agricultural spreader to implement the respective balancing distribution. The setting parameters may relate to the feed point to be set for the spreading material on the spreading disc and/or the speed to be set for the spreading disc of the agricultural spreading machine. Furthermore, the setting parameters may concern the opening size to be set, the opening shape to be set, and/or the opening position to be set of a spreading material supply opening of the agricultural spreading machine. When a spreading disc having one or more throw blades is used for spreading the spreading material, the setting parameters may relate to the blade position to be set, the blade inclination to be set, the blade orientation to be set, and/or the blade length to be set of the one or more throw blades of the spreading disc of the agricultural spreading machine. If, in order to spread the spreading material, the spreading material is guided by means of a feed chute of the agricultural spreader, the setting parameters may relate to the chute inclination to be set, the chute orientation to be set and/or the chute position to be set. Furthermore, the setting parameters may relate to the spreading disc to be used and/or its geometry and/or its type of throw blade.

After selection of the realizable balancing distribution that has the smallest deviation from the determined ideal balancing distribution of the spreading material, the setting parameters associated with the selected realizable balancing distribution may be defined as setting recommendations. The setting recommendations may then be set automatically by the agricultural spreader, so that the agricultural spreader performs a self-configuration for carrying out the balancing distribution.

In an alternative embodiment of the method according to the invention, the determined setting recommendations for the agricultural spreader are output by means of a display device. Preferably, the determined setting recommendations are output by means of a display device of a mobile terminal. Alternatively or additionally, the setting recommendations may be output by a display device of the agricultural spreader. Based on the output setting recommendations, the setting recommendations may then be manually set on the agricultural spreader. For example, the feed point of the spreading material onto the spreading disc and/or the rotational speed of the spreading disc may be manually set.

In another embodiment of the method according to the invention, the determination of the non-uniform spreading material distribution on the usable agricultural area or the non-uniform nutritional status of the plants on the usable agricultural area is carried out by reconnaissance, in particular by remote reconnaissance, of the usable agricultural area. The reconnaissance of the usable agricultural area may be performed, for example, by the agricultural spreading machine and/or a device external to the machine. For example, the agricultural spreading machine or a vehicle carrying or pulling the agricultural spreading machine has at the front one or more predictive sensors, by means of which the nutritional status of the plants on the usable agricultural area may be detected. Remote reconnaissance of the usable agricultural area may also be satellite-based and/or drone-based.

Furthermore, a method according to the invention is advantageous, in which the non-uniform spreading material distribution on the usable agricultural area or the non-uniform nutritional status of the plants on the usable agricultural area is determined by optical evaluation of the usable agricultural area. The optical evaluation may include, for example, evaluating visual images or footage of the usable agricultural area. The visual images may be generated by, for example, one or more cameras, wherein the one or more cameras are disposed on the agricultural spreader, a vehicle carrying or pulling the agricultural spreader, a satellite, or a drone. The optical evaluation may further include a spectral evaluation of the usable agricultural area or the plants on the usable agricultural area. The spectral evaluation may be used to determine the nutritional status of the plants via their color value. Preferably, one or more infrared sensors are used for spectral evaluation.

Furthermore, a method according to the invention is advantageous, in which the non-uniform spreading material distribution on the usable agricultural area or the non-uniform nutritional status of the plants on the usable agricultural area is determined by analyzing the nutritional status of the plants on the usable agricultural area by means of a portable test device. The portable testing device is preferably arranged for analyzing the nitrogen status of the examined plants. The portable test device preferably comprises a measurement sensor system, wherein the measurement sensor system may be configured to detect a nitrogen status. For example, the portable test device may be a nitrogen tester (N-tester). Alternatively, a test application may be performed to determine the non-uniform distribution of spreading material on the usable agricultural area.

Furthermore, a method according to the invention is preferable, in which the non-uniform spreading material distribution on the usable agricultural area is determined by calculating the non-uniform spreading material distribution on the usable agricultural area based on spreading material settings and/or the machine configuration during a spreading operation on the usable agricultural area, which the non-uniform spreading material distribution is based on. The spreading material settings taken into account in the calculation may relate to the set feed point and/or the set spreading disc speed during the spreading operation on the usable agricultural area, which the non-uniform spreading material distribution is based on. The machine configuration taken into account in the calculation may relate to the type of spreading machine used and/or the spreading disc used and/or its geometry and/or its type of throw blade during the spreading operation on the usable agricultural area, which is the cause of the non-uniform spreading material distribution. Furthermore, the spreading material settings taken into account in the calculation may relate to the set opening size, the set opening shape and/or the set opening position of a spreading material supply opening of the agricultural spreading machine during the spreading operation that causes the non-uniform spreading material distribution on the usable agricultural area. When a spreading disc having one or more throw blades has been used to spread the spreading material, the spreading material settings taken into account in the calculation may relate to the set blade position, the set blade pitch, the set blade orientation, and/or the set blade length of the one or more throw blades of the spreading disc of the agricultural spreading machine during the spreading operation that causes the non-uniform spreading material distribution on the usable agricultural area. If the spreading material has been passed through a feed chute of the agricultural spreader during the spreading operation, the spreading material settings considered in the calculation may relate to the set chute inclination, the set chute orientation and/or the set chute position.

Further, a method according to the invention is preferred, in which the non-uniform spreading material distribution on the usable agricultural area is determined by calculating the non-uniform spreading material distribution on the usable agricultural area based on distribution information of the spreading material recorded by the agricultural spreading machine during a spreading operation on the usable agricultural area causing the non-uniform spreading material distribution. The recorded distribution information may relate to the throw distance and/or the ejection angle during the spreading operation causing the non-uniform spreading material distribution on the usable agricultural area. In particular, the distribution information has been recorded by a throw width measuring device and/or a ejection angle measuring device of the agricultural spreading machine. Thus, there is no need for detailed information on the spreading settings during the spreading operation causing the non-uniform spreading material distribution on the usable agricultural area in order to be able to calculate the non-uniform spreading material distribution on the usable agricultural area.

The method according to the invention may also be used to compensate for non-uniform spreading material distributions and/or non-uniform nutritional statuses of plants over a long period of time. For example, non-uniform spreading material distributions on the usable agricultural area may be taken into account, which date back one or more years. Thus, a condition of the usable agricultural area that has led to reduced yields over several years may be significantly improved by means of the method according to the invention.

The method according to the invention is further advantageously embodied in that determining the non-uniform distribution of spreading material on the usable agricultural area comprises determining a non-uniform distribution of a mixed fertilizer on the usable agricultural area and/or determining a non-uniform distribution of one or more individual fertilizers of a mixed fertilizer on the usable agricultural area. When applying mixed fertilizer, the entire mixed fertilizer may be applied in a non-uniform manner. Further, only one individual fertilizer of a compound fertilizer may be applied in a non-uniform manner. Furthermore, several or all of the individual fertilizers of a mixed fertilizer may be applied non-uniformly in different ways. Thus, determining the non-uniform distribution of multiple individual fertilizers of a mixed fertilizer on the usable agricultural area may comprise determining the non-uniform distribution of a first individual fertilizer and a second individual fertilizer of the mixed fertilizer on the usable agricultural area.

In a preferred further embodiment of the method according to the invention, determining the ideal balancing distribution of the spreading material comprises determining an ideal overall balancing distribution, which balances the non-uniformities of the determined distribution of the mixed fertilizer on the usable agricultural area and/or determining one or more ideal individual balancing distributions, which balance the non-uniformities of the determined distribution of the one or more individual fertilizers of the mixed fertilizer on the usable agricultural area. Thus, the method according to the invention also allows the determination of setting recommendations, with which the incorrect application of a mixed fertilizer may be subsequently compensated. If only setting recommendations can be determined, which lead to the compensation of non-uniformities of the determined distribution of only one individual fertilizer, whereby the non-uniformities of the determined distribution of another individual fertilizer remain, a prioritization of an individual fertilizer is preferably carried out, for which the ideal individual balancing distribution is then determined. In this case, it is accepted that the non-uniformities of the distribution of an individual fertilizer are not compensated. The prioritization is preferably carried out by taking into account the volatility of the individual fertilizers of the mixed fertilizer.

The object of the present invention is further solved by a method for spreading a spreading material of the type mentioned at the beginning, wherein the setting recommendations for the agricultural spreading machine are determined according to one of the embodiments described above. With regard to the advantages and modifications of the method according to the invention for spreading a spreading material, reference is made to the advantages and modifications of the method according to the invention for determining setting recommendations for an agricultural spreading machine.

In the following, preferred embodiments of the invention are explained and described in more detail with reference to the accompanying drawings. Here:

Figure 1:
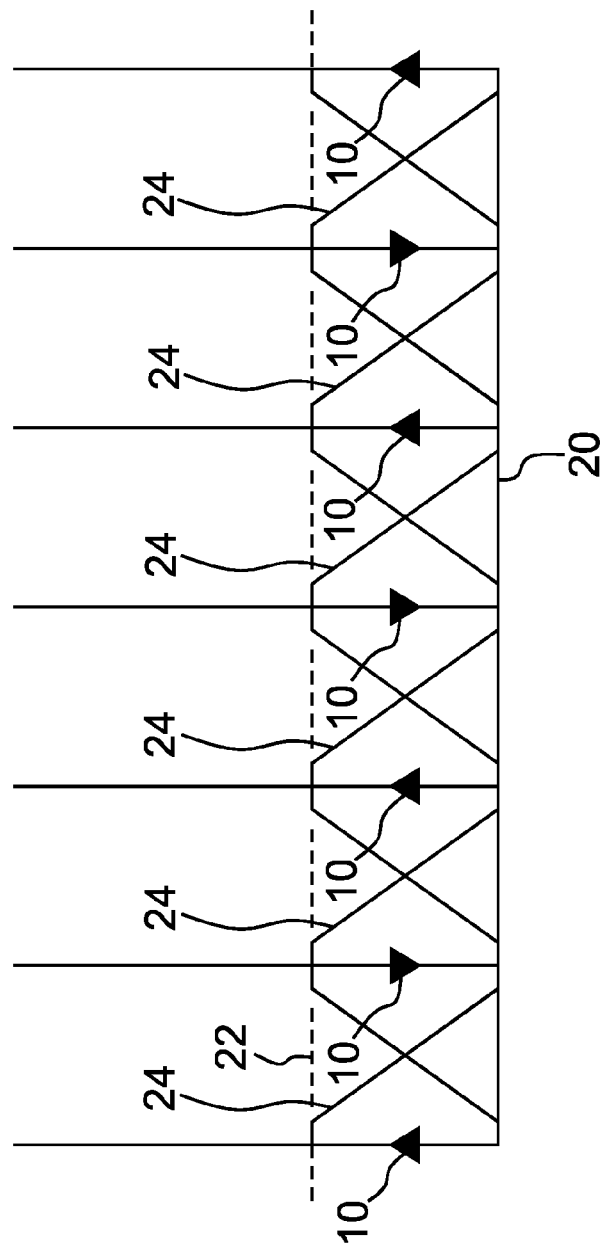
FIG. 1 shows a uniform spreading material distribution on a usable agricultural area.

FIG. 1 shows a usable agricultural area 20, on which a uniform spreading material distribution 22 has been implemented by means of several overlapping schematically illustrated individual distributions 24 based on alternately driven tramlines. The individual distributions 24 and the spreading material distribution 22 are lateral distributions.

The rotational speed of the spreading discs as well as the feed point of the spreading material onto the spreading discs of the schematically illustrated agricultural spreader 10 were correctly adjusted during spreading and the actual flight behavior of the spreading material corresponded to the expected flight behavior.

The illustrated spreading material distribution 22 on the usable agricultural area 20 does not exhibit any non-uniformities and represents an ideal spreading result for a wide range of applications, with the exception of orchards, mixed crops grown in strips or site-specific fertilization requirements.

Due to incorrect settings of the agricultural spreader 10, due to the fact that the actual flight behavior of the spreading material may deviate from the expected flight behavior, and/or due to environmental influences affecting the spreading material application, such as strong wind or rain, a non-uniform spreading material distribution 26 may result on the usable agricultural area 20.

Figure 2:
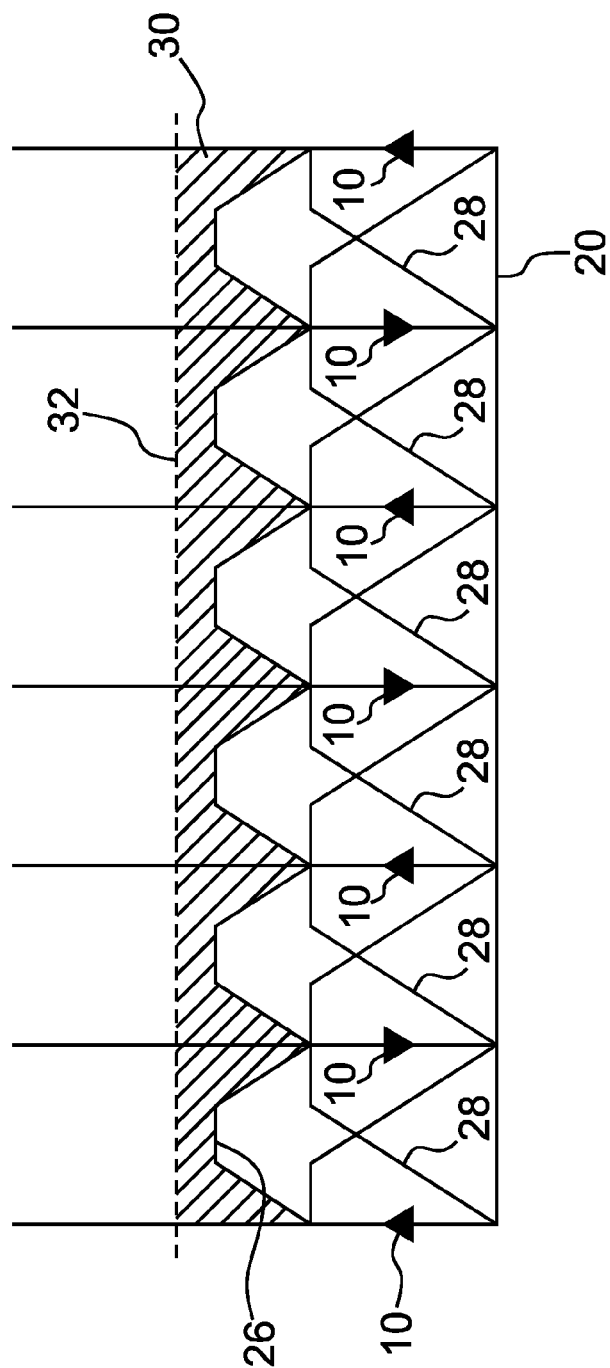
FIG. 2 shows a non-uniform spreading material distribution on a usable agricultural area.

In FIG. 2 there is shown a corresponding non-uniform spreading material distribution 26, which results from the several overlapping individual distributions 28. The individual distributions 28 and the spreading material distribution 26 are lateral distributions.

The non-uniform spreading material distribution 26 leads to a non-uniform nutritional status of the plants on the usable agricultural area 20 during fertilizer application, which is also referred to as technical strip disease. The non-uniform spreading material distribution 26 on the usable agricultural area 20 or the non-uniform nutritional status of the plants on the usable agricultural area 20 is to be compensated for in order to avoid yield losses.

For this purpose, setting recommendations for an agricultural spreader 10 are to be determined, with which the difference 30 to the intended uniform spreading material distribution 32 may be subsequently compensated. The setting recommendations to be determined are recommendations for the feed point of the spreading material to be set on the spreading discs of the agricultural spreading machine 10 and the speed of rotation of the spreading discs of the agricultural spreading machine 10 to be set in order to implement a lateral distribution of the spreading material that causes the compensation of the non-uniformities.

This initially requires either determining the non-uniform spreading material distribution 26 on the usable agricultural area 20 or determining the non-uniform nutritional status of the plants on the usable agricultural area 20.

Determining the non-uniform spreading material distribution 26 on the usable agricultural area 20 may be based on the spreading settings and/or the machine configuration during the spreading operation on the usable agricultural area 20 that causes the non-uniform spreading material distribution 26. Here, the non-uniform spreading material distribution 26 may be calculated on the basis of the set feed point of the spreading material onto the spreading discs and the spreading disc speed as well as the type of spreading disc used during the spreading operation that causes the non-uniform spreading material distribution 26. This calculation is appropriate if the corresponding spreading settings and the machine configuration of the spreading operation causing the non-uniform spreading material distribution 26 are still known and the non-uniformities may be attributed to corresponding incorrect settings on the agricultural spreading machine 10.

Alternatively, the non-uniform spreading material distribution 26 on the usable agricultural area 20 may be determined based on distribution information of the spreading material recorded by the agricultural spreading machine 10 during the spreading operation on the usable agricultural area 20 having caused the non-uniform spreading material distribution 26. In this regard, the recorded distribution information may relate to the throw distance and/or the ejection angle during the spreading operation causing the non-uniform spreading material distribution 26 on the usable agricultural area 20. Furthermore, the recorded distribution information may relate to the disc speed of the spreading discs and/or the feed point of the spreading material onto the spreading discs during the spreading operation underlying the non-uniform spreading material distribution 26 on the usable agricultural area 20. A corresponding calculation is suitable if the agricultural spreading machine 10 was adjusted prior to the spreading operation causing the non-uniform spreading material distribution 26, taking into account an expected flight behavior of the spreading material, however, with the actual flight behavior of the spreading material during the spreading operation deviating from the expected flight behavior. However, in order to enable a corresponding calculation to be carried out, corresponding distribution information has to be recorded during the spreading operation causing the non-uniform distribution of the spreading material 26 by means of a throw width measuring device of the agricultural spreading machine 10 and/or by means of a ejection angle measuring device of the agricultural spreading machine 10.

Alternatively or in addition to the non-uniform spreading material distribution 26, the non-uniform nutritional status of the plants on the usable agricultural area 20 may be determined. For this purpose, a corresponding reconnaissance of the usable agricultural area 20 is performed. For example, the reconnaissance may be performed by the agricultural spreader 10 itself, such as with one or more predictive sensors for analyzing the nutritional status.

Alternatively, the reconnaissance may be a satellite-based or drone-based remote sensing of the usable agricultural area 20. The reconnaissance may include a spectral analysis of the usable agricultural area 20. By means of the spectral analysis, the nutritional status may be detected via the color value of the plants. Visual images generated as part of the reconnaissance may be analyzed. Alternatively, a portable testing device may be used to determine the non-uniform nutritional status of the plants in the usable agricultural area 20. For example, the portable testing device may be a portable nitrogen tester.

Figure 3:
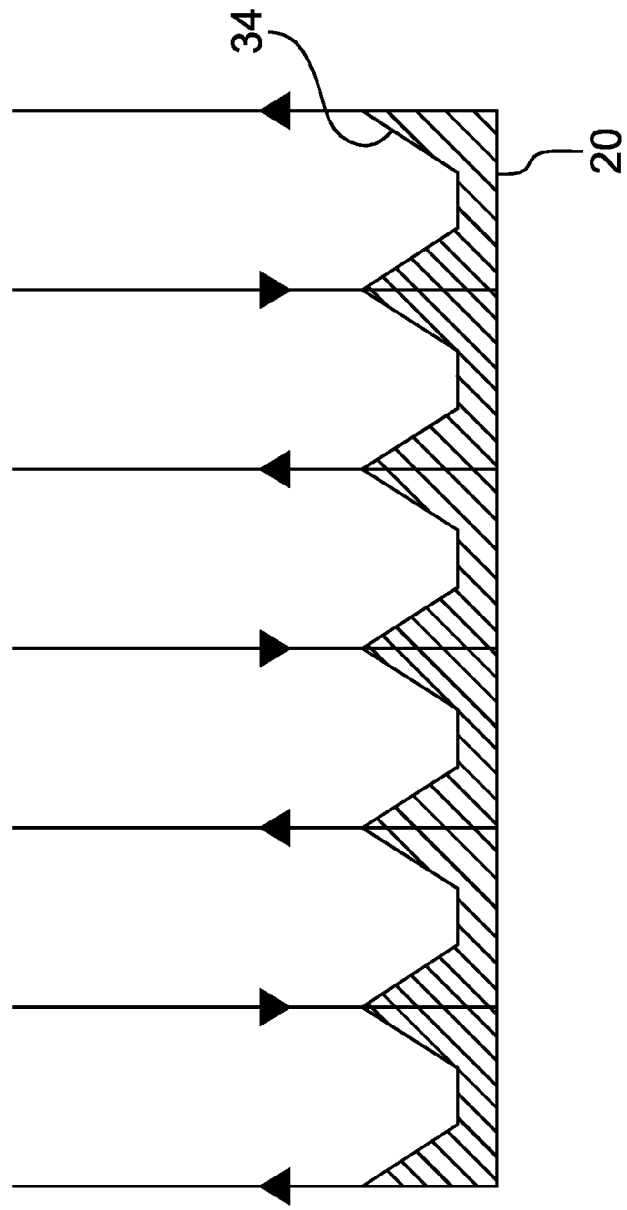
FIG. 3 shows an ideal balancing distribution for compensating a non-uniform spreading material distribution.

FIG. 3 shows an ideal balancing distribution 34 of the spreading material, which compensates for the non-uniformities of the determined spreading material distribution 26 on the usable agricultural area 20 or the non-uniformities of the determined nutritional status of the plants on the usable agricultural area 20. The ideal balancing distribution 34 corresponds to a mirror image of the difference 30 to the intended spreading material distribution 32, which is shown in FIG. 2. Since the non-uniform spreading material distribution 26 may also be referred to as non-uniform spreading pattern, the ideal balancing distribution 34 shown represents a counter spreading pattern for balancing the non-uniformity.

Figure 4:
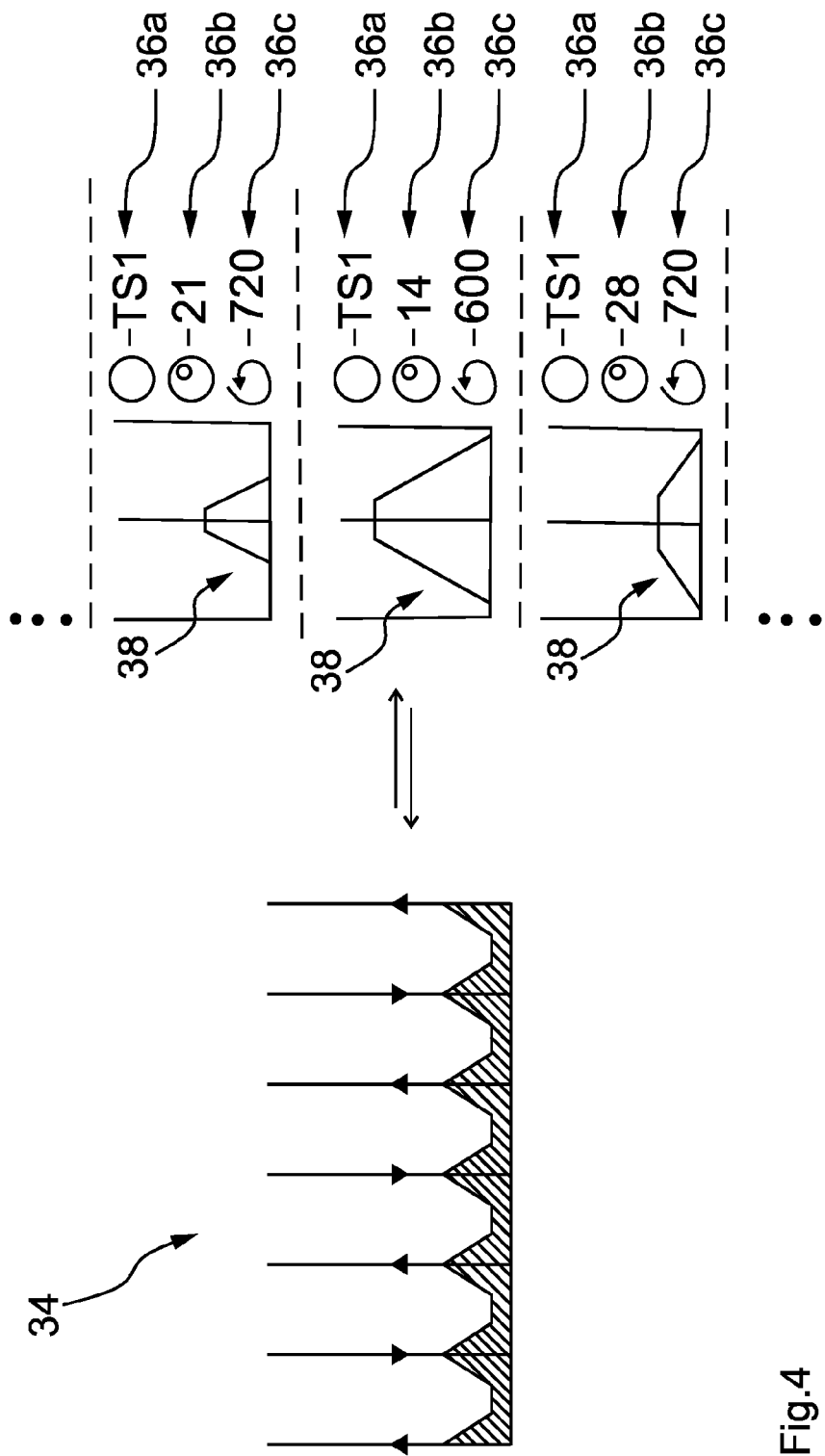
FIG. 4 shows the determining of a realizable balancing distribution that approximates the ideal balancing distribution.

FIG. 4 shows the determination of the setting recommendations for the agricultural spreading machine 10 for implementing a spreading material balancing distribution that may be realized with the agricultural spreading machine 10, wherein the realizable balancing distribution is approximated to the ideal balancing distribution 34.

In determining the setting recommendations for the agricultural spreader 10, a plurality of balancing distributions realizable with the agricultural spreader 10 are first calculated. The calculation of the realizable balancing distributions is based on realizable individual distributions 38, with a set of setting parameters 36a-36c being associated with the respective realizable balancing distributions. The setting parameters 36a-36c relate to a spreading disc to be used to implement the respective spreading material distribution, a feed point to be set and a disc speed to be set.

The calculated balancing distributions that may be realized with the agricultural spreader 10 are then compared with the determined ideal balancing distribution 34 of the spreading material in order to be able to select the realizable balancing distribution that has the smallest deviations from the determined ideal balancing distribution 34 of the spreading material. The setting parameters 36a-36c associated with the selected realizable balancing distribution are then determined as setting recommendations.

The setting recommendations may then either be output for manual setting by the operator via a display device 14, for example a mobile terminal 12, or be set automatically by the agricultural spreader 10.

Figure 5:
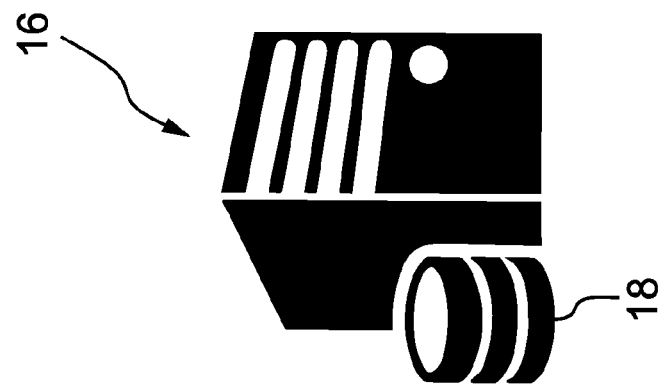
FIG. 5 shows a mobile terminal and a central computer system during data exchange in determining setting recommendations for an agricultural spreader.
Figure 5:
Figure 5:
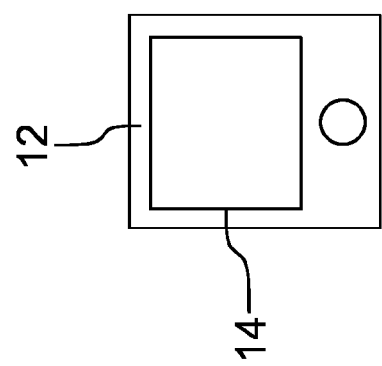

FIG. 5 shows the data exchange of a mobile terminal 12 designed as a smartphone with a central computer system 16. The central computer system 16 is a server, which is operated by a manufacturer of spreading machines, and has a database 18. The database 18 stores spreading data, which may be used to calculate the balancing distributions that may be realized with an agricultural spreading machine 10.

In the illustrated example, the calculations or evaluation operations for determining the non-uniform spreading distribution 26 on the usable agricultural area 20 or the non-uniform nutritional status of the plants on the usable agricultural area 20 are performed by a computing device of the central computer system 16. In addition, the computing device of the central computer system 16 determines the ideal balancing distribution 34 of the spreading material and determines the setting recommendations for the agricultural spreading machine 10 to implement the balancing distribution of the spreading material that may be realized by the agricultural spreading machine 10.

The setting recommendations determined by the central computer system 16 are then provided to the mobile terminal 12 for output. The mobile terminal 12 then displays the determined setting recommendations to the operator by means of the display device 14, so that the operator may appropriately set the agricultural spreader 10. Subsequently, the spreading of spreading material to compensate for the non-uniform distribution of spreading material 26 on the usable agricultural area 20 is carried out by means of the agricultural spreading machine 10.

The computing device performing the calculations and evaluations may further be a component of a terminal, a job computer or other computer system of the agricultural spreading machine 10. Alternatively, the computing device may be a component of the mobile terminal 12. In these cases, the agricultural spreading machine 10 or the mobile terminal 12 may retrieve data, in particular spreading data, from a database for calculation and/or evaluation.

In principle, the method may also be used to determine setting recommendations for non-uniformly spread mixed fertilizer. In this case, a non-uniform distribution of the entire mixed fertilizer or a non-uniform distribution of one or more individual fertilizers of the mixed fertilizer on the usable agricultural area 20 is first to be determined. Then, an ideal total balancing distribution is determined, which compensates for the non-uniformities of the determined distribution of the mixed fertilizer on the usable agricultural area 20, or one or more ideal individual compensation distributions are determined, which compensate for the non-uniformities of the determined distribution of the one or more individual fertilizers of the mixed fertilizer on the usable agricultural area 20.

REFERENCE NUMERALS

10 agricultural spreader
12 mobile terminal
14 display device
16 central computer system
18 database
20 usable agricultural area
22 spreading material distribution
24 individual distributions
26 non-uniform distribution of spreading material
28 individual distributions
30 difference
32 intended spreading distribution
34 ideal balancing distribution
36a-36c setting parameters
38 individual distributions

The invention claimed is:

1. A method for determining setting recommendations for an agricultural spreader, the method comprising the steps of:
    determining, using at least one computing device, a non-uniform spreading material distribution on an agricultural area or a non-uniform nutritional status of plants on the agricultural area;
    determining, using the at least one computing device, an ideal balancing distribution of spreading material that compensates for non-uniformities of the determined spreading material distribution on the agricultural area or non-uniformities of the determined nutritional status of plants on the agricultural area; and
    determining, using the at least one computing device, setting recommendations for an agricultural spreading machine for implementing a balancing distribution of the spreading material that is implemented with the agricultural spreading machine, wherein the realizable balancing distribution is approximated to the ideal balancing distribution,
    wherein the agricultural spreader is configured as a two-disc fertilizer spreader and has two rotatably drivable spreading discs arranged side by side.

2. The method according to claim 1, wherein the at least one computing device is a component of a central computer system of at least one of the agricultural spreading machine or a mobile terminal.

3. The method according to claim 1, wherein determining the setting recommendations for the agricultural spreader for implementing the balancing distribution of the spreading material that is implemented with the agricultural spreader is performed by using spreading data that is stored in a database.

4. The method according to claim 3, wherein determining the setting recommendations for the agricultural spreader for implementing the balancing distribution of the spreading material that is implemented with the agricultural spreader comprises at least one of the following steps:
    calculating a plurality of balancing distributions that are implemented with the agricultural spreader;
    comparing the calculated balancing distributions that are implemented with the agricultural spreader with the determined ideal balancing distribution of the spreading material;
    selecting the realizable balancing distribution that has the smallest deviations from the determined ideal balancing distribution of the spreading material;
    determining the setting parameters associated with the selected realizable balancing distribution as setting recommendations; and
    automatically setting the determined setting parameters by the agricultural spreader.

5. The method according to claim 1, further comprising the step of:
    outputting, by a display device, the determined setting recommendations for the agricultural spreader.

6. The method according to claim 5, wherein the display device is included in a mobile terminal.

7. The method according to claim 1, wherein determining the non-uniform spreading material distribution on the agricultural area or of the non-uniform nutritional status of the plants on the agricultural area (20) is carried out by remote reconnaissance of the agricultural area.

8. The method according to claim 1, wherein the determination of the non-uniform distribution of spreading material on the agricultural area or of the non-uniform nutritional status of the plants on the agricultural area is carried out by optical analysis of the agricultural area.

9. The method according to claim 1, wherein determining the non-uniform spreading material distribution on the agricultural area or the non-uniform nutritional status of the plants on the agricultural area is performed by analyzing the nutritional status of the plants on the agricultural area by a portable testing device.

10. The method according to claim 1, wherein the non-uniform spreading material distribution on the agricultural area is determined by calculating the non-uniform spreading material distribution on the agricultural area based on spreading settings or the machine configuration during a spreading operation on the agricultural crop land causing the non-uniform spreading material distribution.

11. The method according to claim 1, wherein the non-uniform distribution of spreading material on the agricultural area is determined by calculating the non-uniform distribution of spreading material on the agricultural area on the basis of distribution information of the spreading material recorded by the agricultural spreading machine during a spreading operation on the agricultural area causing the non-uniform distribution of spreading material.

12. The method according to claim 1, wherein determining the non-uniform distribution of spreading material on the agricultural area comprises at least one of the following steps:
  determining a non-uniform distribution of a mixed fertilizer on the agricultural area; and
  determining a non-uniform distribution of one or more individual fertilizers of a mixed fertilizer on the agricultural area.

13. The method according to claim 12, wherein determining the ideal balancing distribution of the spreading material comprises at least one of the following steps:
  determining an ideal overall balancing distribution that balances the non-uniformities of the determined distribution of the mixed fertilizer on the agricultural area; and
  determining one or more ideal individual balancing distributions that balance the non-uniformities of the determined distribution of the one or more individual fertilizers of the mixed fertilizer on the agricultural area.

14. The method according to claim 1, further comprising:
  determining setting recommendations for the agricultural spreading machine; and
  automatically setting the determined setting recommendations before or during the spreading operation for spreading a spreading material to balance a non-uniform distribution of the spreading material on an agricultural area by an agricultural spreading machine.

15. A method for determining setting recommendations for an agricultural spreader, the method comprising the steps of:
  determining, using at least one computing device, a non-uniform spreading material distribution on an agricultural area or a non-uniform nutritional status of plants on the agricultural area;
  determining, using the at least one computing device, an ideal balancing distribution of the spreading material that compensates for the non-uniformities of the determined spreading material distribution on the agricultural area or the non-uniformities of the determined nutritional status of plants on the agricultural area; and
  determining, using the at least one computing device, setting recommendations for an agricultural spreading machine for implementing a balancing distribution of the spreading material that is implemented with the agricultural spreading machine, wherein the realizable balancing distribution is approximated to the ideal balancing distribution,
  wherein the agricultural spreader is configured as a two-disc fertilizer spreader and comprises two rotatably drivable spreading discs arranged side by side, and
  wherein determining, using the at least one computing device, the setting recommendations for the agricultural spreader for implementing the balancing distribution of the spreading material that is implemented with the agricultural spreader is performed by using spreading data that is stored on a database, and includes the following steps:
    calculating a plurality of balancing distributions that are implemented with the agricultural spreader;
    comparing the calculated balancing distributions that are implemented with the agricultural spreader with the determined ideal balancing distribution of the spreading material;
  selecting the realizable balancing distribution that has the smallest deviations from the deter-mine ideal balancing distribution of the spreading material;
    determining the setting parameters associated with the selected realizable balancing distribution as setting recommendations; and
    automatically setting the determined setting parameters by the agricultural spreader.

16. The method according to claim 15, wherein the at least one computing device is a component of a central computer system of at least one of the agricultural spreading machine or a mobile terminal.

17. A method for determining setting recommendations for an agricultural spreader, the method comprising the steps of:
  determining, using at least one computing device, a non-uniform spreading material distribution on an agricultural area or a non-uniform nutritional status of plants on the agricultural area;
  determining, using the at least one computing device, an ideal balancing distribution of the spreading material that compensates for the non-uniformities of the determined spreading material distribution on the agricultural area or the non-uniformities of the determined nutritional status of plants on the agricultural area; and
  determining, using the at least one computing device, setting recommendations for an agricultural spreading machine for implementing a balancing distribution of the spreading material that is implemented with the agricultural spreading machine, wherein the realizable balancing distribution is approximated to the ideal balancing distribution,
  wherein the agricultural spreader is configured as a two-disc fertilizer spreader and has two rotatably drivable spreading discs arranged side by side, and
  wherein determining, using the at least one computing device, the setting recommendations for the agricultural spreader for implementing the balancing distribution of the spreading material that is implemented with the agricultural spreader is performed by using spreading data that is stored on a database, and includes the following step:

calculating a plurality of balancing distributions that are implemented with the agricultural spreader.

\* \* \* \* \*